United States Patent [19]

Terry et al.

[11] Patent Number: 4,834,963
[45] Date of Patent: May 30, 1989

[54] MACROCRYSTALLINE TUNGSTEN MONOCARBIDE POWDER AND PROCESS FOR PRODUCING

[75] Inventors: Charles J. Terry; Jack D. Frank, both of Fallon, Nev.

[73] Assignee: Kennametal Inc., Latrobe, Pa.

[21] Appl. No.: 942,333

[22] Filed: Dec. 16, 1986

[51] Int. Cl.$^4$ .................. C01B 31/34; C01G 41/00
[52] U.S. Cl. ...................... 423/440; 423/53; 501/87; 501/93
[58] Field of Search ............... 423/53, 440; 502/177; 501/87, 93

[56] References Cited

U.S. PATENT DOCUMENTS

| | | | |
|---|---|---|---|
| 2,137,144 | 11/1938 | Sainderichin | 501/87 |
| 3,301,645 | 1/1967 | Smiley | 501/87 |
| 3,379,503 | 4/1968 | McKenna | 423/53 |
| 3,438,729 | 4/1969 | Ohlgren | 501/87 |
| 3,848,062 | 11/1974 | Steiger | 423/440 |
| 4,124,665 | 11/1978 | Petersen | 423/440 |
| 4,216,009 | 8/1980 | Miyake et al. | 423/440 |
| 4,330,332 | 5/1982 | Schachner et al. | 75/203 |
| 4,454,105 | 6/1984 | Wada et al. | 423/440 |
| 4,460,697 | 7/1984 | Hara et al. | 501/87 |
| 4,478,611 | 10/1984 | Selden | 423/440 |
| 4,489,044 | 12/1984 | Gomes et al. | 423/53 |
| 4,497,874 | 2/1985 | Hale | 428/551 |

OTHER PUBLICATIONS

"Metals Handbook," 8th Edition, vol. 1 (1961), p. 38.
"McGraw-Hill Dictionary of Scientific and Technical Terms," Second Edition, (1978), p. 1618.
Smith, E. N., "Macro Process for Direct Production of Tungsten Monocarbide," Metal Powder Report, vol. 35, No. 2 (Feb. 1980), pp. 53, 54.

Primary Examiner—Anthony McFarlane
Attorney, Agent, or Firm—John J. Prizzi

[57] ABSTRACT

In the alumino-thermit method of producing tungsten monocarbide powders, metallic iron is added to the reaction charge in quantities to control the calculated reaction temperature within the range of about 4372° to about 4500° F. It has been found that this process can now be controlled to produce macrocrystalline tungsten carbide powders which are very low in Ti, Ta and Nb content and have a very narrow range of total carbon contents.

13 Claims, No Drawings

MACROCRYSTALLINE TUNGSTEN MONOCARBIDE POWDER AND PROCESS FOR PRODUCING

BACKGROUND OF THE INVENTION

The present invention relates to a process for the production of macrocrystalline tungsten monocarbide powder and the powder resulting therefrom.

THE PRIOR ART

In the past, tungsten monocarbide powders have been produced mainly by two routes, the direct carburization process and the alumino thermit process (also known as the Macro Process). The direct carburization process involves subjecting tungsten metal, tungstic acid or tungsten oxide powder to carburization with finely divided carbon at about 1400 to 1700 degrees Centigrade. This process produces a fine, very irregularly shaped powder typically in the size range of two to eight microns.

The powder produced by this process is typically very low in Ti, Ta and Nb, but the total carbon content is difficult to control and varies from lot to lot, typically within the range of 5.98 to 6.25 weight percent. While this powder is suitable for further processing by conventional powder metallurgy techniques into cemented carbide products, such as mining and metal cutting tips, the variation in carbon content about the stoichiometric value for tungsten carbide (WC), 6.13 w/o, can produce instability during sintering if not properly compensated for by uniformly blending in carbon (for substochioometric WC: C<6.13) or W or $W_2C$ (for superstoichiometic WC: C>6.13).

The alumino thermit process is described in detail in Philip C. McKenna U.S. Pat. No. 3,379,503, assigned to Kennametal Inc., the specification of which is hereby incorporated by reference in its entirety, and in E. N. Smith, "MACRO Process for Direct Production of Tunsgten Monocarbide," Metal Powder Report, Vol. 35, No. 2, (February 1980) Pages 53, 54. In the commercial process which was based on that described in the aforementioned patent, a mixture of tungsten ore concentrates and iron oxide are reduced by aluminum metal and simultaneously carburized by the use of a carbon source, such as calcium carbide and carbon. Where needed, a manganese source was added if manganese were not present in sufficient quantity within the tungsten ore concentrates used. In addition, plant residues (i.e., slag) from prior thermit runs which contain mainly calcium oxide, calcium aluminates were also sometimes added.

The reactants were proportioned to develop a self-sustaining exothermic reaction at a calculated temperature of about 4433° F. (2445° C.). To facilitate the operation and to permit regulation of the reaction, the charge was divided into portions of substantially uniform weight contained in sheet aluminum bags for progressively charging and maintaining the reaction.

It was found, based on commercial production experience, that a temperature window exists in which the calculated temperature should not deviate from a maximum of about 4500° F. (2482° C.) or a minimum of about 4372° F. (2412° C.) in order to minimize the amount of undesirable carbide phases such as $W_2C$ and other undercarburized compounds of the $M_3W_3C$ type, such as $Fe_3W_3C$. To stay within the proper calculated temperature range, it was found necessary in the past to blend low grade tungsten ore concentrates (containing less than 55 w/o tungsten) with high grade tungsten ore concentrates. The guage from the low grade ore concentrates acted as diluent to help control and reduce the calculated reaction temperature.

Since the low grade tungsten ore concentrates also did not contain as much oxygen as the high grade ore concentrates, iron oxides, such as mill scale or iron ore pellets, were equipped to provide an additional oxygen source for the aluminum to react with. The iron from the oxides was used to help control the fluidity of the reaction pool which is determined bythe ratio of W to Fe plus Mn. It was found that to get the proper separation between the WC and slag formed during the reaction, and to obtain well formed large crystals of WC, that the ratio of W to Fe plus Mn should be held at about 2.125.

The low grade tungsten ore concentrates utilized, compared to high grade concentrates, often contained higher concentrations of Ti, Nb and/or Ta as impurities which were carburized during the process forming solid solution carbide phases in the resultant tungsten monocarbide powder.

The reaction was performed in a circular kiln built to withstand the temperature reached and to be relatively unaffected by the reaction products. The kiln was designed to minimize heat losses by using graphite slabs for the inner walls backed by insulating carbon. The outer walls were constructed of high temperature refractory bricks. The top of the kiln was partially covered by refractory bricks and is provided with a central opening for charging and the escape of reaction gases.

A typical charge would contain 70,000 kg of reactants, namely: tungsten ore concentrates, iron oxide, aluminum and calcium carbide and would optionally have included plant residues, carbon and a manganese source. The complete reduction and carburization reaction required about 60 minutes and yielded about 25,000 kilograms of tungsten monocarbide.

The aforementioned aluminum consisted mainly of scrap aluminum cans which were assumed to contain 4 w/o of metallic iron from scrap steel cans which were assumed to be erroneously included therein. These scrap aluminum cans also added Ti contamination from the paint on the cans.

Preparatory to starting the reaction, the kiln was preheated to about 800° C. The reaction was initiated by throwing into the preheated kiln: (1) several aluminum bags containing a starter compound of 24 w/o finely divided aluminum, 71.9 w/o iron oxide, 2.4 w/o potassium chlorate, and 1.7 w/o sulfur; and (2) a starter or heater mix of aluminum bags containing aluminum fines, iron oxide, calcium carbide. As soon as a pool of molten iron was formed, the main charge was added at a rate necessary to maintain the reaction at a substantially steady state.

At the end of the reaction, the kiln and its contents were allowed to cool with the formation of a lower heavy layer of crystal mass and an upper slag layer. The crystal mass contained about 60 to 63 w/o WC with the remainder being most of the metallic iron, manganese and excess metallic aluminum along with small amounts of slag materials. The crystal mass was separated from the slag and crushed. It was then washed with water to remove excess calcium carbide and treated with an acid solution containing $H_2SO_4$, HCl and small amounts of HF to remove the iron, manganese and aluminum. Additional conventional mineral separation methods were used for final cleaning of the tungsten monocarbide crystals. The resultant WC powder was coarse compared with WC powder produced by the direct carburization process, with the majority of the powder being coarser than 400 mesh (i.e., 37 microns). The final powder, known as macrocrystalline WC powder, typically contained impurities at the levels shown in Table I.

TABLE I

| Impurity | Weight Percent |
| --- | --- |
| Fe | 0.17 |
| $SiO_2$ | 0.01 |
| C (Free) | 0.02 |
| Acid Insolubles | 0.02 |
| Ti | 0.20 |
| Ta | 0.08 |
| Nb | 0.05 |
| Mo | 0.01 |

The contents of Ti, Ta and Nb in these powders could, however, be as high as 1.00 w/o, 0.20 w/o and 0.20 w/o, respectively. The total carbon content of WC powders produced by the alumino-thermit process typically ranged from 6.18 to 6.20 w/o. These higher than stoichiometric carbon contents were a reflection of the presence of the Ti, Nb and/or Ta present as solid solution carbides in the final powder.

These powders, especially the coarser mesh fractions, were used in hardfacing applications and in matrix powder mixtures to support diamonds. In addition, with milling to reduce particle size, these powders were also successfully used to form cemented carbide tips for mining tools.

In this last application because of the better uniformity of total carbon content observed in macrocrystalline WC compared to direct carburization WC powders, generally higher quality tips can be made with macrocrystalline WC. However, the presence of the cubic carbide forming elements in macrocrystalline WC material complicated the manufacturing of these cemented carbide tips insofar as extraordinary steps were taken during the cemented carbide tip fabrication process to assure the solid solution carbides (e.g. WTiC) phases were homogeneously distributed in the final sintered product. Clustering of these phases was believed to lead to a reduction in strength of the final sintered product.

Macrocrystalline WC powder can be readily distinguished from direct carburization powder by the sharp, angularly shaped crystals found in macrocrystalline powder.

There is, therefore, clearly a need for a new process for producing WC powders which can be controlled to provide a macrocrystalline WC powder which has a very tightly controlled carbon content while also having a very low Ti, Ta and Nb content.

SUMMARY OF THE INVENTION

We have now discovered that the calculated temperature for the alumino thermit process of producing macrocrystalline tungsten monocarbide can be adequately regulated by blending metallic iron with tungsten ore concentrates, preferably with little, and more preferably without, any low grade tungsten ore concentrates. By limiting the amount of low grade concentrates used, there is less gangue and therefore more room in a given size kiln for cyrstal mass. In addition, the higher grade concentrates produce more tungsten carbide than the lower grade concentrates for a given weight of concentrate. Since the metallic iron acts as a gangue, it absorbs heat from the reaction. In addition, the amount of iron oxides, such as $Fe_3O_4$, needed to satisfy the required ratio of W to Fe plus Mn can now be reduced in proportion to the amount of metallic iron added.

By using metallic iron, a reduction in undesirable impurities (e.g., Ti, Nb, Ta) can now be achieved insofar as these impurities are normally higher in low grade ore concentrates. Further reductions in titanium content are preferably achieved by utilizing only paint free aluminum can scrap in the reaction charge. We have, therefore, also discovered that by using this new process a high purity macrocrystalline tungsten monocarbide powder can now be produced containing, at most, very low concentrations of solid solution carbide phases.

In accordance with our invention, a process is provided for making macrocrystalline tungsten monocarbide from a blend of tungsten ore concentrates. The blend contains at least 55 w/o tungsten, and more preferably, at least 57 w/o tungsten. Preferably, the individual tungsten sources constituting the blend also each contains greater than 55 w/o tungsten. In addition, the blend contains less than or equal to 0.03 w/o Ti, 0.03 w/o Ta and 0.03 w/o Nb.

Preferably, the blend of tungsten ore concentrates contains both wolframite and scheelite ore concentrates.

The present invention includes the steps of:

(1) providing a reaction charge constituted of the foregoing blend of tungsten ore concentrates, calcium carbide, metallic aluminum, up to 0.43 kilograms of iron oxide per kilogram of tungsten in the charge, and 0.04 to 0.31 kilograms of mmetallic iron per kilogram of tungsten in the charge;

(2) proportioning the reaction charge to provide, upon ignition, a self-sustaining exothermic reaction to develop a calculated operating temperature within the charge of about 4372° to about 4500° F. with production of a crystal mass of crystalline tungsten monocarbide containing residual calcium carbide and metallic aluminum in amounts providing a reducing condition at the end of the reaction;

(3) disposing a first portion of the reaction charge in a kiln and igniting it;

(4) progressively feeding the rest of said reaction charge into the kiln at a rate to maintain a continuous substantially smooth reaction;

(5) separating the crystal mass from the slag products of the reaction; and (6) recovering crystalline tungsten monocarbide from the crystal mass.

In a preferred alternative embodiment of the process according to the present invention, a heater charge of metallic aluminum, iron oxide and calcium carbide is placed in the kiln and ignited prior to introducing the reaction charge.

It has been found also, in accordance with the present invention, that macrocrystalline tungsten carbide powder lots can now be produced which contain no more than: 0.03 w/o Ti, 0.03 w/o Ta and 0.03 w/o Nb and have a total carbon content of about 6.14 to 6.16 w/o.

These and other aspects of the foregoing invention will become more apparent upon review of the following detailed description of the invention.

DETAILED DESCRIPTION OF THE INVENTION

The present process and powders which are improvements over the alumino-thermit process and powders described in McKenna U.S. Pat. No. 3,379,503 may best be understood by reference to the following examples which are intended to be purely illustrative of the present invention.

In accordance, with the present invention, a heater charge and a reaction charge, proportioned into a first and second charge, were provided in the weights (kg) shown in Table II. The compositions of the tungsten ore concentrate lots and metallic iron powder listed in Table II are provided in Table III. It can clearly be seen that two lots of scheelite ($CaWO_4$) and two lots of wolframite ($FeMnWO_4$) have been blended to produce a blend containing 59.66 w/o tungsten and having overall Ta, Ti and Nb contents of 0.03, 0.02 and 0.02 w/o, respectively. While one of the scheelite lots is a low grade lot, containing 47.83 w/o W, it also has very low concentrations of Ta, Ti and Nb (0.00, 0.01 and 0.00, respectively). The ratio of metallic iron to tungsten in the blend is 0.07. The ratio of mill scale ($Fe_3O_4$) to tungsten in the charge is 0.27.

TABLE II

| MATERIAL | % W | 1st Charge | 2nd Charge | Heater | Total | KILOS W |
|---|---|---|---|---|---|---|
| Aluminum (fines) | | | | 100 | 100 | |
| Aluminum cans[1] | | 5930 | 5931 | 259 | 12120 | |
| Mill Scale | | 2805 | 2805 | 916 | 6526 | |
| Carbon[2] | | 351 | 350 | | 701 | |
| Mn Ore[3] | | 622 | 622 | | 1244 | |
| Calcium Carbide[4] | | 3445 | 3445 | 66 | 6956 | |
| ORE CONCENTRATES LOT NO. | | | | | | |
| KW6774 | 59.97 | 6781 | 6781 | | 13562 | 8133 |
| KW6954 | 59.78 | 6419 | 6419 | | 12838 | 7675 |
| KS23541A | 62.19 | 5400 | 5401 | | 10801 | 6717 |
| KS284 | 47.83 | 1400 | 1399 | | 2799 | 1339 |
| SLAG | | 1200 | 1200 | | 2400 | |
| IRON POWDER | | 860 | 860 | | 1720 | |
| TOTAL | | 35213 | 35213 | 1341 | 71767 | 23864 |

[1] Paint free scrap Al cans are 99.5 w/o Al. However, due to likelihood that scrap steel cans are also mixed in, it is assumed that the Al can charge is 96 w/o Al and 4 w/o Fe.
[2] Carbon is petroleum coke or other carbon source.
[3] 48 w/o Mn, 19 w/o oxygen.
[4] Assumed $CaC_2$ is 80 w/o $CaC_2$ and 20 w/o CaO.

TABLE III

| | AMOUNT | | $H_2O$ | TC | FC | TA | TI | NB | S | $SiO_2$ | CU | MO | FE | MN | W |
|---|---|---|---|---|---|---|---|---|---|---|---|---|---|---|---|
| WOLFRAMITE | | | | | | | | | | | | | | | |
| KW6774 | % | 51.37 | 0.01 | 0.00 | 0.00 | 0.04 | 0.02 | 0.02 | 0.04 | 0.39 | 0.02 | 0.00 | 15.54 | 2.70 | 59.97 |
| | WT | 13562 | 1.4 | 0.0 | 0.0 | 5.4 | 2.7 | 2.7 | 5.4 | 52.9 | 2.7 | 0.0 | 2107.5 | 366.2 | 8133 |
| KW6954 | % | 48.63 | 0.01 | 0.00 | 0.00 | 0.04 | 0.01 | 0.04 | 0.03 | 0.01 | 0.01 | 0.00 | 15.44 | 2.77 | 59.79 |
| | WT | 12838 | 1.3 | 0.0 | 0.0 | 5.1 | 1.3 | 5.1 | 3.9 | 1.3 | 1.3 | 0.00 | 1982.2 | 355.6 | 7675 |
| TOTAL | % | 100.00 | 0.01 | 0.00 | 0.00 | 0.04 | 0.02 | 0.03 | 0.04 | 0.21 | 0.02 | 0.00 | 15.49 | 2.73 | 59.88 |
| | WT | 26400 | 2.7 | 0.0 | 0.0 | 10.5 | 4.0 | 7.8 | 9.3 | 54.2 | 4.0 | 0.0 | 4089.7 | 721.8 | 15808 |
| SCHEELITE | | | | | | | | | | | | | | | |
| KS2541A | % | 79.42 | 0.02 | 0.00 | 0.00 | 0.00 | 0.02 | 0.00 | 0.01 | 0.36 | 0.01 | 0.02 | 0.07 | 0.00 | 62.19 |
| | WT | 10810 | 2.2 | 0.0 | 0.0 | 0.0 | 2.2 | 0.0 | 1.1 | 38.9 | 1.1 | 2.2 | 7.6 | 0.0 | 6717 |
| KS284 | % | 20.58 | 0.03 | 0.00 | 0.00 | 0.00 | 0.01 | 0.00 | 0.18 | 7.57 | 0.01 | 0.00 | 0.96 | 0.00 | 47.83 |
| | WT | 2799 | 0.8 | 0.0 | 0.0 | 0.0 | 0.3 | 0.0 | 5.0 | 211.9 | 0.3 | 0.0 | 26.9 | 0.0 | 1339 |
| TOTAL | % | 100.00 | 0.02 | 0.00 | 0.00 | 0.00 | 0.02 | 0.00 | 0.04 | 1.84 | 0.01 | 0.02 | 0.25 | 0.00 | 59.23 |
| | WT | 13600 | 3.0 | 0.0 | 0.0 | 0.0 | 2.5 | 0.0 | 6.1 | 250.8 | 1.4 | 2.2 | 34.5 | 0.0 | 8056 |
| CONCENTRATE TOTAL | % | 100.00 | 0.01 | 0.00 | 0.00 | 0.03 | 0.02 | 0.02 | 0.04 | 0.76 | 0.01 | 0.01 | 10.31 | 1.80 | 59.66 |
| | WT | 40000 | 5.7 | 0.0 | 0.0 | 10.5 | 6.5 | 7.8 | 15.4 | 305.0 | 5.4 | 2.2 | 4124.2 | 721.8 | 23864 |
| PLANT RESIDUES | | | | | | | | | | | | | | | |
| SLAG | % | 0.00 | 0.00 | 0.00 | 0.00 | 0.00 | 0.00 | 0.00 | 0.00 | 0.00 | 0.00 | 0.00 | 0.00 | 0.00 | 0.00 |
| | WT | 2400 | 0.0 | 0.0 | 0.0 | 0.0 | 0.0 | 0.0 | 0.0 | 0.0 | 0.0 | 0.0 | 0.0 | 0.0 | 0 |
| TOTAL | % | 100.00 | 0.00 | 0.00 | 0.00 | 0.00 | 0.00 | 0.00 | 0.00 | 0.00 | 0.00 | 0.00 | 0.00 | 0.00 | 0.00 |
| | WT | 2400 | 0.0 | 0.0 | 0.0 | 0.0 | 0.0 | 0.0 | 0.0 | 0.0 | 0.0 | 0.0 | 0.0 | 0.0 | 0 |
| TOTAL ALL W BEARING MATERIAL (excludes Fe powder) | % | 100.00 | 0.01 | 0.00 | 0.00 | 0.02 | 0.02 | 0.02 | 0.04 | 0.72 | 0.01 | 0.01 | 9.73 | 1.70 | 56.28 |
| | WT | 42400 | 5.7 | 0.0 | 0.0 | 10.5 | 6.5 | 7.8 | 15.4 | 305.0 | 5.4 | 2.2 | 4124.2 | 721.8 | 23864 |
| FE POWDER | % | 100.00 | | 0.36 | | | | | | 0.02 | 0.30 | | | 0.00 | 0.07 | |
| | WT | 1720 | | 6.2 | | | | | | 0.3 | 5.2 | | | 0.0 | 1.2 | |

In accordance with the present invention, the ratio of the metallic iron to tungsten contained in the reaction charge may be as high as about 0.31 kg of metallic iron per kg of tungsten. This upper limit is based on a minimum calculated temperature of 4372° F., where the scheelite to wolframite ratio is 40/60 by weight and all the mill scale ($Fe_3O_4$) is replaced by metallic iron.

Where the wolframite ore concentrate contains 55 w/o or more tungsten, metallic iron additions should be made in accordance with my invention, to reduce the calculated reaction temperature. Preferably, these additions should be made at a level of at least 0.04 kg metallic iron per kg of tungsten in the charge. Since it is preferable to maintain the W/Fe+Mn ratio at 2.125, any addition of metallic iron should decrease the amount of iron input from the mill scale by an equal amount. The iron additions made herein may be in the form of essentially pure iron or an iron base alloy, such as a commercial ferrotungsten alloy.

The percentage of scheelite and wolframite concentrates forming the total blend concentrate is preferably about 34 and 66 percent by weight, respectively, as shown in Table III. We have found that these proportions are preferred in that the CaO available from the scheelite reaction in this ratio is believed to assist in providing the slag produced during the reaction with the proper consistency and composition.

The wolframite concentrate used in this reaction may include ferberite, $FeWO_4$, hubnerite, $MnWO_4$, artifical hubnerite and artificial ferberite. Artificial scheelite may be substituted for the natural scheelite concentrates used herein.

As shown in Table III, plant residue, such as slag, left from prior thermit reactions is recycled by adding it to the ore concentrates. For a 40,000 kg ore concentrate charge, the amount of the slag added preferably does not exceed 3500 kilograms since the added slag reduces the volume available in the kiln for crystal mass. In this example, 2400 kilograms are utilized. The slag is composed of CaO and calcium aluminates ($CaO.Al_2O_3$ and $CaO.2Al_2O_3$). It may also contain minor amounts of carbon and active tungsten as $WO_3$. In the present example, both C and $WO_3$ were not present in the slag utilized.

In the Alumino-Thermit Reaction, the following reactions are believed to take place:

(A) Wolframite:
$$Fe(Mn)WO_4 + 3CaC_2 + 14Al \rightarrow 6WC + 6Fe + 3CaO + 7Al_2O_3$$

(B) Scheelite:
$$6CaWO_4 + 3CaC_2 + 10Al \rightarrow 6WC + 9CaO + 5Al_2O_3$$

(C) Active W (from Slag):
$$6WO_3 + 2CaC_2 + 10Al \rightarrow 6WC + 3CaO + 5Al_2O_3$$

(D) Mill Scale:
$$3Fe_3O_4 + 8Al \rightarrow 9Fe + 4Al_2O_3$$

(E) FeO (excess iron in Wolframite based on subtraction of theoretical iron concentration from actual measured iron concentrations in Wolframite utilized):
$$3FeO + 2Al \rightarrow 3Fe + Al_2O_3$$

The quantities (i.e. proportions) of metallic iron, aluminum, $CaC_2$, C, Mn, $Fe_3O_4$ required for this example were calculated as follows, based on the foregoing reaction equations, the chemistry and quantities (i.e. proportions) of tungsten ore concentrates and slag which were previously described, the maintenance of the ratio W/Mn+Fe=2.125 in the reaction charge, and a calculated reaction temperature of 4433° F.

I. CARBON REQUIREMENTS

CALCIUM CARBIDE:
Based on 132.50% of Theoretical Required

| | |
|---|---|
| 1. Total moles of W reacting from concentrates (Total W Input from concentrates ÷ 183.86) | 129.79 |
| 2. Total moles of active W in slag (Total active W input from sludges ÷ 183.86) | 0.00 |
| 3. Total moles of $CaC_2$ required ((1. × 0.5) + (2. × 0.3)) | 64.90 |
| 4. Total moles of $CaC_2$ Added (3. × (132.50% Of Theoretical × .01)) | 85.99 |
| 5. Excess moles of $CaC_2$ (4.−3.) | 21.09 |
| 6. $CaC_2$ added (4. × 64.1) ÷ (80.00% $CaC_2$ × .01) | 6890 |

ADDITIONAL CARBON AS PETROLEUM COKE OR OTHER CARBON SOURCE:
Based on 45% additional Carbon Required

| | |
|---|---|
| 7. Additional Carbon Required (((total W imput ÷ .9387) - total W input) × 45.00% additional carbon × .01)) | 701.27 |
| 8. Total moles of additional Carbon Added (7. ÷ 12.01) | 58.39 |
| 9. Additional carbon added (7. - total free carbon input) | 701 |

II. Fe + Mn Requirement Based on: W/Fe + Mn = 2.125

FOR CONCENTRATE

| | |
|---|---|
| 10. Target grade, % W (Including Metallic Iron) | 57.20 |
| 11. Metallic Iron required to obtain target grade ((total W in concentrates ÷ (target grade × .01)) - total concentrate weight | 1720.0 |
| 12. Total Fe + Mn available from Wolframite | 4811.5 |
| 13. Total Fe + Mn available from Scheelite | 34.5 |
| 14. Total Fe + Mn available from concentrates & metallic iron | 6566.0 |
| 15. Theoretical Fe + Mn in Wolframite (W in Wolframite × 0.3038) | 4802.4 |
| 16. Excess Fe as FeO (12.−15.) | 9.1 |
| 17. Moles of excess Fe as FeO (16. ÷ 55.85) | 0.16 |
| 18. Total Fe + Mn required (Total W in concentrates ÷ 2.125) | 11229.9 |
| 19. Fe + Mn added from Mill Scale & Mn Ore (18.−14.) | 4663.9 |
| 20. Total Mn Required (total Wolframite weight × 0.05) | 1320.0 |
| 21. Mn added from Mn Ore (20. - Mn available from concentrates & metallic iron) | 597.0 |
| 22. Mn Ore Added ((21. ÷ (48.00% Mn from Mn Ore × .01)) | 1244 |
| 23. Fe added from Mill Scale (19.−21.) | 4066.9 |
| 24. Mill Scale Added ((23. ÷ (72.50% Fe for Mill Scale × .01)) | 5610 |

FOR RESIDUES:

| | |
|---|---|
| 25. Fe + Mn available from residues | 0.0 |
| 26. Total Fe + Mn required (total W in residues ÷ 2.125) | 0.0 |
| 27. Fe added from Mill Scale (26.−25.) | 0.0 |
| 28. Mill Scale Added (27. ÷ 72.50% Fe for mill scale × .01) | 0 |

FOR COMBINED:

| | |
|---|---|
| 29. Total Fe added from Mill Scale for Concentrates & Residues (23. + 27.) | 4066.9 |
| 30. Mn added from Mn Ore for Concentrates | 597.0 |
| 31. Additional Fe + Mn Oxide Sources | 4663.9 |
| 32. Moles of Fe + Mn in additional oxide sources (31. ÷ 55.85) | 83.51 |
| 33. Total oxygen added from Mn Ore ((22. × (19.00 × .01)) | 1374.5 |
| 34. Total oxygen added from Mn Ore ((22. × (19.00 × .01)) | 236.40 |
| 35. Moles of oxygen in additional oxide sources ((33. + 34.) ÷ 16.00)) | 100.68 |

III. ALUMINUM REQUIREMENTS BASED ON 128% OF THEORETICAL REQUIRED

| | |
|---|---|
| 36. Moles of W from Wolframite (total W in Scheelite ÷ 183.86) | 85.98 |
| 37. Moles of W from Scheelite (total W in Scheelite ÷ 183.86) | 43.82 |
| 38. Moles of Active W in residues (total Active W in Residues ÷ 183.86) | 0.00 |
| 39. Moles of Al required for Wolframite reaction (36. × 2.333) | 200.59 |

|   |   |
|---|---|
| 40. Moles of Al required for Scheelite reaction (37. × 1.667) | 73.05 |
| 41. Moles of Al required for active W in residue reaction (38. × 1.667) | 0.00 |
| 42. Moles of Al required for excess Fe as FeO Reaction (17. × 0.667) | 0.11 |
| 43. Moles of Al required for additional oxygen sources reaction (35. × 0.667) | 67.15 |
| 44. Total Moles of Al Required (39. + 40. + 41. + 42. + 43.) | 340.90 |
| 45. Total Moles of Al Added (44. × 1.28) | 436.35 |
| 46. Excess Moles of Al (45.−44.) | 95.45 |
| 47. Total Al added as cans & bags (45. × 26.98) | 11773 |
| 48. Al added as bags (Estimated bag count × 0.069 kgs/bag) | 386 |
| 49. Al added as cans (45.−48.) | 11387 |
| 50. Cans added (49. ÷ (96.00% × 0.01)) | 11861 |

IV. GANGUE ADDITIONS
GANGUE CONSIDERED AS FE:

|   |   |
|---|---|
| 51. Fe from Al scrap Cans ((50. × (100−96.00) × .01) | 474.4 |
| 52. Moles of Fe + Mn from Metallic Iron, Scheelite, Slag and Aluminum ((11. + 13. + 25. + 51.)) ÷ 55.85) | 39.91 |

GANGUE CONSIDERED AS CaO:

|   |   |
|---|---|
| 53. CaO from $CaO_2$ addition (6. × ((100−80% $CaC_2$) × .01)) | 1378.0 |
| 54. CaO from Wolframite addition (total Wolframite added − (total W from Wolf. ÷ 0.6054)) | 288.8 |
| 55. CaO from Scheelite addition ((total scheelite added − (total W from Scheelite ÷ 0.6385)) − Fe + Mn in Scheelite) | 948.6 |
| 56. Moles of CaO gangue ((53. + 54. + 55.) ÷ 56.08) | 46.64 |

GANGUE CONSIDERED AS $Al_2O_3$:

|   |   |
|---|---|
| 57. Moles of $Al_2O_3$ from residues (total gangues from residues ÷ 101.96) | 23.54 |

ACTIVE W IN RESIDUES:

|   |   |
|---|---|
| 58. Moles of active W in residues (total active W in residue ÷ 183.86) | 0.00 |

V. TEMPERATURE CALCULATIONS
PRODUCTS OF REACTIONS:

|   |   |
|---|---|
| 59. Total Moles WC (36. + 37. + 38. + 58.) | 129.80 |
| 60. Total Moles of Fe + Mn (36. + 17. + 32. + 52.) | 209.56 |
| 61. Total Moles of CaO ((36. × 0.5) + (37. × 1.5) + (38. × .5) + 56.) | 155.36 |
| 62. Total Moles of $Al_2O_3$ ((36. × 1.1667) + (37. × 1.5) + (38. × 0.8333) + (42. × 0.3333) + (43. × 0.5) + 57.) | 193.98 |
| 63. Moles of Excess Al | 95.45 |
| 64. Moles of Excess $CaC_2$ | 21.09 |
| 65. Moles of Additional Carbon | 58.39 |

TO HEAT REACTION PRODUCTS FROM 77 F. TO 5000 F.:

|   |   |
|---|---|
| 66. WC (59. × 2.205 lb/kg × 57,500 BTU/lb-Mole) | $1.646 \times 10^7$ |
| 67. Fe (60. × 2.205 lb/kg × 54,000 BTU/lb-Mole) | $2.495 \times 10^7$ |
| 68. CaO (61. × 2.205 lb/kg × 88,000 BTU/lb-Mole) | $3.015 \times 10^7$ |
| 69. $Al_2O_3$ (62. × 2.205 lb/kg × 201,000 BTU/lb-Mole) | $8.597 \times 10^7$ |
| 70. Al (63. × 2.205 lb/kg × 39,000 BTU/lb-Mole) | $8.208 \times 10^6$ |
| 71. $CaC_2$ (64. × 2.205 lb/kg × 109,000 BTU/lb-Mole) | $5.069 \times 10^6$ |
| 72. C (65. × 2.205 lb/kg × 27,500 BTU/lb-Mole) | $3.541 \times 10^6$ |
| 73. Total Heat requirement to 5000 F. (66. + 67. + 68. + 69. + 70. + 71. + 72.) | $1.743 \times 10^8$ |

TO HEAT REACTION PRODUCTS FROM 77 F. TO 4500 F.:

|   |   |
|---|---|
| 74. WC (59. × 2.205 lb/kg × 51,000 BTU/lb-Mole) | $1.460 \times 10^7$ |
| 75. Fe (60. × 2.205 lb/kg × 49,000 BTU/lb-Mole) | $2.264 \times 10^7$ |
| 76. CaO (61. × 2.205 lb/kg × 58,000 BTU/lb-Mole) | $1.987 \times 10^7$ |
| 77. $Al_2O_3$ (62. × 2.205 lb/kg × 184,000 BTU/lb-Mole) | $7.870 \times 10^7$ |
| 78. Al (63. × 2.205 lb/kg × 35,000 BTU/lb-Mole) | $7.366 \times 10^6$ |
| 79. $CaC_2$ (64. × 2.205 lb/kg × 99,000 BTU/lb-Mole) | $4.604 \times 10^6$ |
| 80. C (65. × 2.205 lb/kg × 24,000 BTU/lb-Mole) | $3.090 \times 10^6$ |
| 81. Total Heat requirement to 4500 F. (74. + 75. + 76. + 77. + 78. + 79. + 80.) | $1.509 \times 10^8$ |
| 82. BTU's required to raise from 4500 F. to 5000 F. (73.−81.) | $2.348 \times 10^7$ |
| 83. Temperature per BTU (500 F. ÷ 82.) | $2.13 \times 10^{-5}$ |

HEAT REACTION AT 77 F.

|   |   |
|---|---|
| 84. Heat from Wolframite reaction (36. × 2.205 lb/kg × 483,900 BTU/lb-mole) | $9.174 \times 10^7$ |
| 85. Heat from Scheelite reaction (37. × 2.205 lb/kg × 305,100 BTU/lb-mole) | $2.948 \times 10^7$ |
| 86. Heat from active W in residue reaction (38. × 2.205 lb/kg × 376,794 BTU/lb-mole) | 0.000 |
| 87. Heat from additional oxygen source reaction (43. × 2.205 lb/kg × 178,632 BTU/lb-mole) | $2.645 \times 10^7$ |
| 88. Heat from excess Fe as FeO reaction (42. × 2.205 lb/kg × 187,200 BTU/lb-mole) | $4.541 \times 10^4$ |
| 89. Total Reaction Heat (84. + 85. + 86. + 87. + 88.) | $1.477 \times 10^8$ |

FINAL REACTION TEMPERATURE:

|   |   |
|---|---|
| 90. Theoretical Temperature (((89.−81.) × 83.) + 4500 F.) | 4433° F. |

It should be understood that the amount of metallic iron added to the reaction charge, 1720 kg of powder having the chemistry shown in Table III, was established by adding metallic iron in 10 kg increments and recalculating the reaction temperature each time, until the calculated reaction temperature was reduced to 4433° F. The final calculation is what is reproduced above.

The required quantities of aluminum cans, mill scale, carbon, manganese ore, calcium carbide and iron powder were then blended into the blend of tungsten ore concentrates and slag to produce the reaction charge. This reaction charge was then divided into two equal amounts for a first and second charge and placed in about 5,594 aluminum bags for charging into the kiln.

A standard heater charge (i.e., igniter mix) consisting of aluminum fines, aluminum cans, and calcium carbide was then provided as shown in Table II. This heater charge was also divided into aluminum bags and thrown into the kiln which was preheated to about 1400° to 1500° F. along with 10 to 15 conventional bombs consisting of finely divided aluminum, iron oxide and sulfur mixed with potassium chlorate in aluminum bags to raise the temperature of the kiln and form a pool of molten iron therein.

In the manner described in U.S. Pat. No. 3,379,503, the first and second reaction charges described herein were then progressively added to the kiln at a rate sufficient to maintain the reaction heat while minimizing both adverse heat losses and excessive boiling of the kiln contents. The total reaction time was about 60 minutes. After cooling, the crystal mass containing the WC was separated from upper slag layer and crushed. The iron, manganese, aluminum, $CaC_2$ and other impurities were then separated from crystal mass by standard leaching, cleaning, and mineral separation techniques as described in the Background. Approximately 25,000 kg of macrocrystalline WC were thus recovered.

the composition of the macrocrystalline WC produced by this example, as well as that of another run made in accordance with the present invention (but not described herein) is shown in Table IV.

TABLE IV

| CHEMISTRY OF FINISHED MACROCRYSTALLINE WC | |
|---|---|
| Fe | 0.17 w/o |
| SiO$_2$ | 0.01 w/o |
| FC$_{(free\ carbon)}$ | 0.02 w/o |
| Insolubles | 0.02 w/o |
| Ti | 0.02–0.03 w/o |
| Ta | 0.00–0.02 w/o |
| Nb | 0.00–0.01 w/o |
| Mo | 0.00 |
| TC$_{(total\ carbon)}$ | 6.15 |

A typical size distribution of the resulting macrocrystalline WC powder is shown in Table V. While the majority of the powder by weight is greater than 37 microns in size, it should be understood that this macrocrystalline WC powder may be milled to a very fine size for use in molding WC-cobalt cemented carbide tooling. The very low Ti, Ta, Nb content of the macrocrystalline powder in accordance with the present invention along with its tight tolerance on total carbon content, near 6.13 w/o, make it ideally suited for conventional powder metallurgical processing into cemented carbide tooling, such as mining and construction tool tips.

TABLE V

| TYPICAL MACROCRYSTALLINE POWDER SIZE | | | |
|---|---|---|---|
| MICRONS | USA SIEVE MESH NO. | W/O | CUMULATIVE W/O |
| 420 | 40 | 2.3 | 2.3 |
| 250 | 60 | 4.4 | 6.7 |
| 177 | 80 | 5.6 | 12.3 |
| 149 | 100 | 4.6 | 16.9 |
| 105 | 140 | 13.3 | 30.2 |
| 74 | 200 | 17.7 | 47.9 |
| 37 | 400 | 31.6 | 79.5 |
| | −400 | 20.5 | 100.0 |

Other embodiments of the invention will be apparent to those skilled in the art from a consideration of this specification or practice of the invention disclosed herein. It is intended that the specification and examples be considered as illustrative only, with the true scope and spirit of the invention being indicated by the following claims.

What is claimed is:

1. A method of making macrocrystalline tungsten monocarbide from a blend of tungsten ore concentrates containing at least 55 weight percent tungsten, comprising the steps of:

providing a reaction charge of said blend of tungsten ore concentrates, calcium carbide, metallic aluminum, up to 0.43 kilograms of iron oxide per kilogram of tungsten in the charge and 0.04 to 0.31 kilograms of metallic iron per kilogram of tungsten in the charge;

wherein said reaction charge is proportioned to provide, upon ignition, a self-sustaining exothermic reaction to develop a calculated operating temperature within the charge of about 4372° to about 4500° F. with production of a crystal mass of crystalline tungsten monocarbide containing residual calcium carbide and metallic aluminum and iron in amounts providing a reducing condition at the end of the reaction;

disposing a first portion of said reaction charge in a kiln and igniting said reaction charge;

progressively feeding the rest of said reaction charge into the kiln;

separating said crystal mass from slag products of said reaction;

and recovering crystalline tungsten monocarbide from said crystal mass.

2. The method according to claim 1 wherein said blend of ore concentrates contains at least 57 weight percent tungsten.

3. The method according to claim 1 wherein said metallic iron is provided by a ferrotungsten alloy.

4. The method according to claim 1 further comprising:

formulating said blend of tungsten ore concentrates by blending tungsten ore concentrates, each of which contains less than 0.03 weight percent Ti; 0.03 weight percent Ta and 0.03 weight percent Nb.

5. The method according to claim 1 further comprising:

formulating said blend of tungsten ore concentrates by blending tungsten ore concentrates, each of which contains greater than 55 weight percent W and less than 0.03 weight percent Ti; 0.03 weight percent Ta and 0.03 weight percent Nb.

6. The method according to claim 1 further comprising:

formulating said blend of tungsten ore concentrates by blending Wolframite and Scheelite ore concentrates.

7. The method according to claim 6 wherein each of said Wolframite and Scheelite ore concentrates contains more than 55 weight percent tungsten.

8. The method according to claim 6 wherein each of said Wolframite and scheelite ores contains less than 0.03 weight percent Ti; 0.03 weight percent Nb and 0.03 weight percent Ta.

9. A process of making crystalline tungsten monocarbide by an alumino thermit process comprising the steps of:

providing a heater charge of metallic aluminum, iron oxide and calcium carbide;

providing a reaction charge of a blend of tungsten sources, said blend containing at least 55 weight percent tungsten, calcium carbide, metallic aluminum, metallic iron in the ratio of 0.04 to 0.31 kilograms iron per kilogram of tungsten in the charge;

disposing said heater charge in a kiln and igniting said heater charge;

progressively feeding said reaction charge into the kiln containing the ignited heater charge to develop a calculated operating temperature of about 4372° to about 4500° F. with production of a crystal mass of tungsten monocarbide containing residual calcium carbide, and metallic aluminum in amounts to provide a reducing condition at the end of the reaction;

separating said crystal mass from slag products of said reaction; and recovering crystalline tungsten monocarbide from said crystal mass.

10. In an alumino-thermit reaction for producing macrocrystalline tungsten carbide (WC) by reacting tungsten ore concentrates with a carbon source and metallic aluminum, the improvement comprising the step of adding a controlled amount of metallic iron into said alumino-thermit reaction to produce a calculated alumino-thermit reaction temperature between about 4372° and about 4500° F.

11. The process according to claim 10, wherein the amount of metallic iron added is limited to abot 0.04 to about 0.31 kilogram of metallic iron per kilograms of tungsten in the reaction charge.

12. A tungsten carbide powder lot consisting essentially of:
   macrocrystalline tungsten monocarbide powder having no more than 0.03 weight percent Ti, 0.03 weight percent Ta and 0.03 weight percent Nb, and having a total carbon content in the range of 6.14 to 6.16 weight percent;
   and wherein the macrocrystalline tungsten monocarbide powder is produced by an alumino-thermit reaction which includes reacting a chargestock comprising tungsten ore concentrates with a carbon source and metallic aluminum to produce a calculated alumino-thermit reaction temperature bewteen about 4372° and about 4500° F.

13. The tungsten carbide powder lot according to claim 12 wherein at least a majority by weight of said macrocrystalline tungsten monocarbide powder is greater than 37 microns in size.

* * * * *